(12) United States Patent
Karnjate et al.

(10) Patent No.: US 7,805,232 B2
(45) Date of Patent: Sep. 28, 2010

(54) ADAPTIVE ELECTRONIC BRAKE SYSTEM CONTROL APPARATUS AND METHOD

(75) Inventors: Timothy M. Karnjate, Grand Blanc, MI (US); William K. Manosh, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 614 days.

(21) Appl. No.: 11/759,455

(22) Filed: Jun. 7, 2007

(65) Prior Publication Data

US 2008/0306667 A1 Dec. 11, 2008

(51) Int. Cl.
*G06G 7/00* (2006.01)
(52) U.S. Cl. .......................................... 701/70; 303/121
(58) Field of Classification Search ................ 701/70, 701/1; 303/121, 113.1, 113.4, 122, 122.08
See application file for complete search history.

(56) References Cited

U.S. PATENT DOCUMENTS

| 5,172,785 | A | * | 12/1992 | Takahashi | .................... | 180/271 |
| 5,230,549 | A | * | 7/1993 | Osada et al. | .................... | 303/3 |
| 6,007,160 | A | * | 12/1999 | Lubbers et al. | .......... | 303/114.1 |
| 6,099,086 | A | | 8/2000 | Feigel et al. | | |
| 6,226,586 | B1 | * | 5/2001 | Luckevich et al. | ............ | 701/70 |
| 6,390,565 | B2 | * | 5/2002 | Riddiford et al. | ............... | 303/3 |
| 2003/0038442 | A1 | * | 2/2003 | Chernoff et al. | ......... | 280/124.1 |
| 2004/0186648 | A1 | * | 9/2004 | Zheng et al. | .................. | 701/70 |

FOREIGN PATENT DOCUMENTS

| DE | 19510522 A1 | 9/1996 |
| DE | 10141547 A1 | 6/2002 |
| EP | 0964804 B1 | 12/1999 |

\* cited by examiner

*Primary Examiner*—Khoi Tran
*Assistant Examiner*—Stephen Holwerda
(74) *Attorney, Agent, or Firm*—Quinn Law Group, PLLC

(57) ABSTRACT

A vehicle has a controller with a threshold brake pedal apply force and an algorithm for determining a first braking torque request corresponding to a pedal apply force, a second braking torque request corresponding to a pedal travel position, and a calculated third braking torque request. The third torque request is calculated by multiplying the first torque request by an average percentage variance of the second to the first torque request. An adaptive electronic brake system (EBS) includes force and travel sensors connected to a brake pedal for determining a force-based and travel position braking torque request, and an algorithm for adapting one of the force-based and travel position-based braking torque requests to the other despite variances over time in a force/travel relationship therebetween.

10 Claims, 3 Drawing Sheets

ADAPTIVE ELECTRONIC BRAKE SYSTEM CONTROL APPARATUS AND METHOD

TECHNICAL FIELD

The present invention relates to an adaptive control method and apparatus usable with an electronic braking system (EBS) having a brake pedal travel position sensor and a brake pedal apply force sensor, the method and apparatus being operable for continuously applying a variable multiplier to a travel position-based braking torque request to thereby more closely approximate a force-based braking torque request.

BACKGROUND OF THE INVENTION

Conventional automotive vehicles typically include a mechanical brake pedal that is connected to a brake lever or arm. The motion of the brake arm in turn actuates a braking mechanism, such as a disc brake or a drum brake, to thereby slow and/or stop the vehicle. The rate of deceleration imparted to the vehicle depends on the amount of force applied to actuate or depress the brake pedal and on the travel position of the brake pedal within or along the range of motion of the brake pedal. Conventional hydraulic braking systems in particular are powered by a supply of pressurized brake fluid delivered from a master cylinder. Such a mechanical, fluid-powered braking system responds relatively quickly and accurately to a force applied to the brake pedal through the pedal's entire range of motion, providing what could be described as a "normal" or conventional brake pedal "feel".

By way of contrast, a by-wire or electronic braking system (EBS) is often used in electric vehicles, as well as in hybrid vehicles which are alternately and selectively powered by an internal combustion engine or fuel cell and one or more electric motor/generators. Using an EBS, the braking command or input applied as a force to a brake pedal by an operator of the vehicle is converted by an encoder device into an electrical braking signal. This electrical braking signal, also known as a braking torque request, is then rapidly transmitted or communicated to the point of application, where one or more actuators operate in response to the signal to slow or stop the vehicle. Braking torque in a vehicle having an EBS may be applied directly using an electro-hydraulic and/or an electromechanical braking mechanism to apply pressure to brake calipers to slow the vehicle, or more commonly by applying an opposing torque to an individual electronic braking unit positioned in proximity to each wheel, and/or to a transmission output shaft, thereby slowing the vehicle in a precisely controlled manner.

In an electric or a hybrid vehicle, the brake pedal is isolated from the actual point of application of the braking torque, and therefore is attached to one or more pedal sensors which detect or measure the pressure on the brake pedal and/or the position of the brake pedal and convert the measurements into the aforementioned transmittable electrical signal. A controller has preprogrammed braking system logic for translating the electrical signal into a corresponding braking torque request. Typically, such braking logic includes one or more accessible braking torque look-up tables containing specific braking torque requests corresponding to the detected brake pedal forces for a particular sensor type.

Certain pressure or force sensors may have less than optimal resolution, particularly under low force conditions, such as might occur when very light pressure is applied to a brake pedal. Using a brake pedal force sensor alone under these conditions may result in an error or variance in the braking torque request that is communicated to the EBS when compared to the vehicle operator's intended braking force. While sensors used to measure a brake pedal's relative position within or along its range of motion, i.e. the brake pedal travel, generally have better resolution at lower pressure ranges, mechanical hysteresis within the braking system may also potentially lead to errors or variances in the resulting applied braking torque request in the event of an attempted direct or immediate switch between sensors during low pressure applications.

SUMMARY OF THE INVENTION

Accordingly, a vehicle is provided having a brake pedal for delivering a braking request, a first sensor for detecting a brake pedal travel position and direction of travel of the brake pedal, a second sensor for detecting a brake pedal apply force, and an electronic braking system (EBS) component configured to slow or stop the vehicle in response to the braking request. The vehicle includes a controller having a stored threshold brake apply force window and an adaptive algorithm for determining a travel position-based braking torque request, a force-based braking torque request, and an adapted braking torque request.

In one aspect of the invention, the adapted braking torque request is determined by multiplying the travel position-based braking torque request by an adjustable multiplier factor, and the controller applies the EBS component according to the adapted braking torque request when the braking request is based on the detectable brake pedal travel position.

In another aspect of the invention, the travel position-based braking torque request is continuously multiplied by the multiplier factor to determine the adapted braking torque request.

In another aspect of the invention, the adjustable multiplier factor is adjusted only when the controller determined the presence of a predetermined vehicle condition.

In another aspect of the invention, the controller has a stored window of acceptable error, and is operable for calculating an average percentage variance of the travel position-based braking torque request over the force-based braking torque request.

In another aspect of the invention, the average percentage variance is calculated only when the detectable brake pedal travel direction is not decreasing.

In another aspect of the invention, a method is provided for adapting a travel position-based braking torque request to approximate a force-based braking torque request in a hybrid vehicle having an electronic braking system (EBS) actuated by a brake pedal. The method includes comparing a travel position-based braking torque request to a force-based braking torque request to determine an average percentage variance therebetween, continuously multiplying the travel position-based braking torque request by an adjustable multiplier factor to calculate an adapted braking torque request, and adjusting the value of the adjustable multiplier factor upon determination of a predetermined vehicle condition. The average percentage variance is calculated when the detected apply force on the brake pedal has a value falling within a stored threshold brake apply force range and the detected brake pedal travel direction is not decreasing.

In another aspect of the invention, the predetermined condition is determined when the average percentage variance falls outside of a stored window of acceptable error.

In another aspect of the invention, the adjustable multiplier factor is initialized to 1, and then adjusted by a stored percentage upon determination of the predetermined vehicle condition.

In another aspect of the invention, an adaptive EBS is provided for a vehicle having a depressible brake pedal with a detectable apply force and a detectable travel position, including a force sensor operatively connected to the brake pedal for determining a force-based braking torque request and a travel sensor operatively connected to the brake pedal for determining a travel position-based braking torque request. The EBS controller has an algorithm configured to adapt the travel position-based braking torque request to the force-based braking torque request, despite physical changes in a relationship between the force-based and travel position-based braking torque requests.

In another aspect of the invention, the controller is configured to continuously multiply the travel position-based braking torque request by an adjustable multiplier factor during operation of the vehicle.

In another aspect of the invention, the controller is operable for calculating an average percentage variance between the travel position-based and force-based torque requests based on a predetermined number of samples, and the adjustable multiplier is adjusted by a predetermined amount when the calculated average percentage variance falls outside of a stored window of acceptable error.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
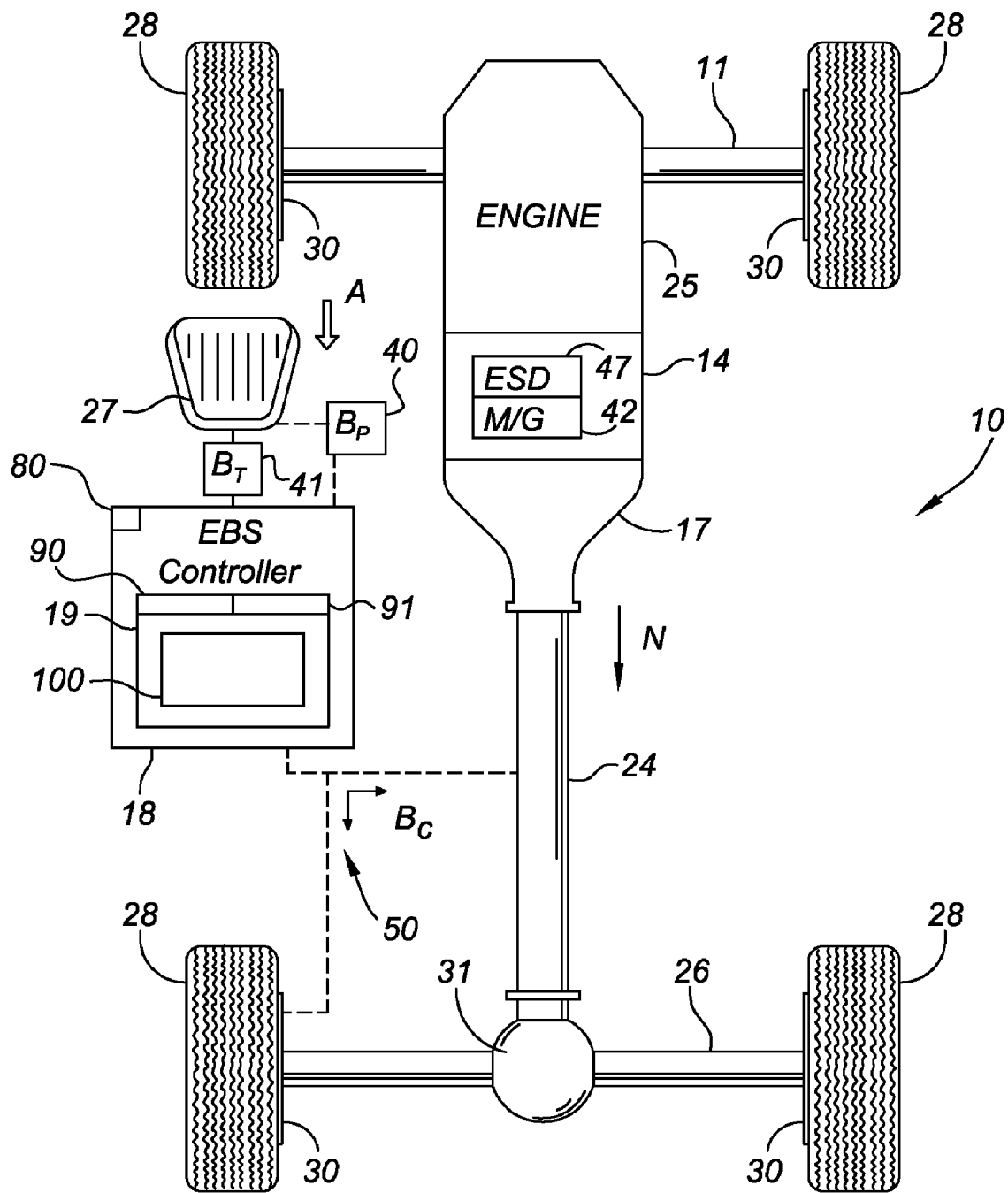
FIG. 1 is a schematic representation of a vehicle chassis having a controller with an adaptive brake pedal algorithm according to the invention.

Referring to the drawings wherein like reference numbers correspond to like or similar components throughout the several figures, there is shown in FIG. 1 a vehicle 10 having a plurality of wheels 28, an electronic braking system (EBS) control unit or controller 18, and an engine 25 that is selectively connectable to a transmission 17 having a rotatable output member 24. Vehicle 10 is preferably a hybrid vehicle having an alternate power supply 14 including an energy storage device (ESD) 47, such as a rechargeable battery or battery pack, and at least one electric motor/generator 42 operable for alternately powering or propelling the vehicle 10 and/or one or more of its various subsystems. However, vehicle 10 may be any vehicle utilizing an EBS controller 18 as described herein, such as an electric vehicle or a fuel-cell powered vehicle.

EBS controller 18, referred to hereinafter for simplicity as controller 18, is operable for detecting a braking or apply force (arrow A) applied to a brake pedal 27 using a pair of brake pedal sensors 40 and 41 connected thereto. Controller 18 is configured to calculate, select, or otherwise determine a corresponding braking request ($B_C$) in response to the detected and recorded measurements or readings. Controller 18 then communicates the braking request ($B_C$) to a braking mechanism to slow or stop the vehicle 10, preferably to an individual electronic braking unit 30 positioned in proximity to each of the wheels 28 and/or to output member 24 by-wire and/or via datalink. The braking request ($B_C$) is transmitted across one or more command signal transmission channels or lines 50 to the electronic braking units 30 and/or output member 24, where the braking request ($B_C$) can act to oppose the torque of each electronic braking unit 30 and/or output member 24 to slow or stop vehicle 10 as needed.

Depending on the specific drive configuration of vehicle 10, output member 24 may be driveably connected to a rear differential 31, which is configured to distribute rotational force or torque from a rotatable output member 24, such as a driveshaft, to rear drive axle 26 for powering or driving a plurality of wheels 28 at the rear of vehicle 10. Although not shown in FIG. 1, vehicle 10 may also have a substantially similar front differential suitable for distributing torque to front drive axle 11 for powering or driving a plurality of wheels 28, such as in a four-wheel or all-wheel drive configuration. Transmission 17 is configured to deliver a variable transmission output speed N to output member 24, with transmission output speed N being variably opposable by braking request ($B_C$), as determined by controller 18.

Controller 18 includes programmable memory 19 and a microprocessor 80 configured to rapidly execute the necessary control logic for implementing and controlling the electronic braking units 30 and/or output member 24 as needed, using a brake pedal transition logic method or algorithm 100 (see FIG. 2) which is programmed or stored in memory 19. Controller 18 is electrically connected, whether directly by-wire or indirectly via datalink signal as described hereinabove, to a brake pedal travel sensor 41 and a brake pedal pressure or force sensor 40, each of which are in electric communication with brake pedal 27.

Travel sensor 41 (also labeled $B_T$ in FIG. 1) is preferably a pedal position and range sensor configured or adapted to precisely detect, measure, or otherwise determine the relative position and direction of travel of brake pedal 27 along a fixed range of motion when the brake pedal 27 is depressed or actuated. Pressure or force sensor 40 (also labeled $B_P$ in FIG. 1) is preferably a pressure transducer or other suitable pressure sensor configured or adapted to precisely detect, measure, or otherwise determine an apply pressure or force (arrow A) imparted to brake pedal 27 by an operator of vehicle 10. The measurements or readings taken by travel sensor 41 and force sensor 40 are transmittable or communicable to controller 18 or are otherwise determinable thereby as needed for use with algorithm 100 of the invention, which is described in further detail later hereinbelow.

Memory 19 of controller 18 is preloaded or preprogrammed with a pair of braking torque look-up tables 90 and 91, i.e. braking torque data tables readily accessible by controller 18 in implementing or executing algorithm 100. Lookup table 90, referred to hereinafter as force table 90, corresponds to the recorded measurements or readings of force sensor 40 and contains an associated commanded braking request ($B_C$) appropriate for each of the detected force measurements as determined by force sensor 40. Likewise, look-up table 91, referred to hereinafter for clarity as travel table 91, corresponds to the measurements or readings of travel sensor 41 and contains a commanded braking request ($B_C$) appropriate for the detected position of travel sensor 41.

Controller 18 preferably normally operates according to force table 90, and force table 90 therefore acts as a preferred or default table. However, as described previously hereinabove, pressure or force sensors such as force sensor 40 tend to have relatively low resolution under low apply pressure conditions, while travel sensors such as travel sensor 41 do not typically share these particular limitations. Therefore, travel table 91 may be used in place of force table 90 during periods of low force resolution of force sensor 40 in order to avoid a perceptible discontinuity or variance between the braking request ($B_C$) and the operator's intended braking force. However, discontinuity may result from mechanical hysteresis or lag in response time in the various components comprising the electronic braking system, and therefore transitioning instantaneously between force table 90 and travel table 91 and may result in a less than optimal braking performance. Accordingly, a separate variable and adaptive braking torque request is provided, which is initially a travel position-based braking torque request (TBR) determined by travel table 91, and which is modified as needed by a multiplier M (see FIG. 2) to more closely model or approximate a force-based braking torque request (FBR) as determined by force table 90.

Figure 2:
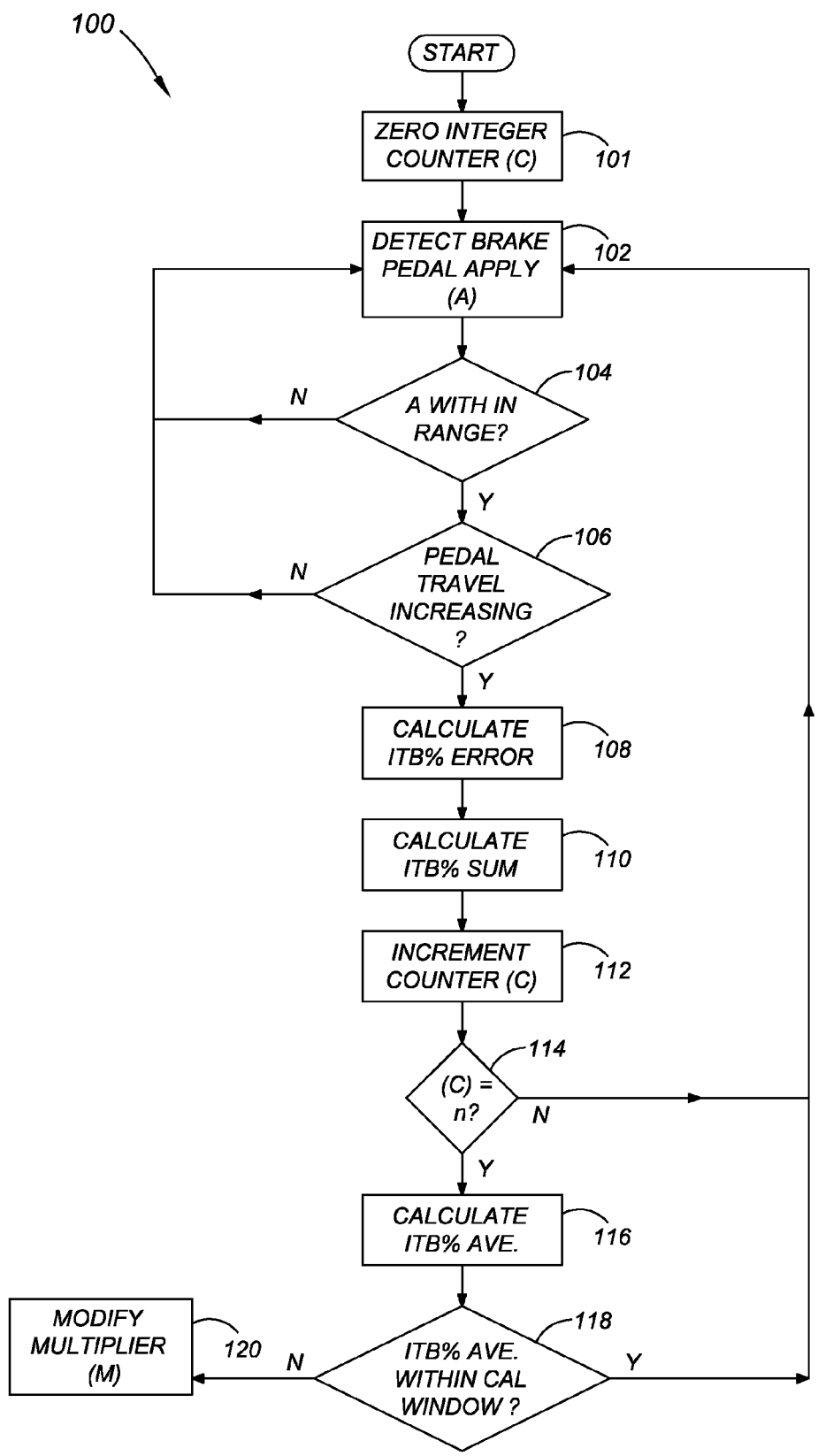
FIG. 2 is a flow chart describing the adaptive brake pedal algorithm of the invention.

Turning to FIG. 2, algorithm 100 is provided to actively adapt a travel-position based braking torque request (TBR), i.e. the braking request ($B_C$) determined based on or using travel sensor 41 (see FIG. 1), to more closely approximate or match a force-based braking torque request (FBR), i.e. the braking request ($B_C$) based on or determined using force sensor 40 (see FIG. 1), thereby facilitating a smooth and efficient switch or transition between travel and force sensors 41 and 40, respectively. As explained hereinabove, an electronic braking system (EBS) may have a slightly different force/travel relationship relative to the actual position of brake pedal 27 (see FIG. 1). Additionally, this force/travel relationship may vary over time, for example due to the introduction of air into a vehicle hydraulic system through service and/or absorption of water into a supply of brake fluid. Some measurable difference in the force/travel relationship may also result from different driver apply rates, as no two people will apply brake pedal 27 in exactly the same manner over time. Accordingly, using algorithm 100, the variance over time of a particular electronic braking system (EBS), build variation, and/or component tolerances may be properly accounted for.

Using algorithm 100 of the invention, electronic braking performance is optimized, and the "feel" of brake pedal 27 (see FIG. 1) should more closely approximate the motion and feel of a conventional mechanical braking pedal as described hereinabove. To ensure the continuous adaptation or virtual "learning" of algorithm 100, algorithm 100 is preferably executed per a sufficiently rapid and continuous cycle or control loop, preferably of approximately 5 to 10 milliseconds, but which may be performed more or less frequently depending on the available speed or power of microprocessor 80 (see FIG. 1). Finally, within algorithm 100 a force-based braking torque request (FBR) remains constant while travel position-based braking torque request (TBR) is permitted to adapt or vary to thereby model or approximate the force-based braking torque request (FBR).

Beginning with step 101, an integer counter (C) is zeroed or initialized in memory 19 of controller 18 (see FIG. 1). Integer counter (C) is any digital or analog device capable of counting upward by positive whole numbers in response to a predetermined event, and of retaining the current count for access by algorithm 100 as needed and described later hereinbelow. After counter (C) has been properly zeroed or initialized, algorithm 100 proceeds to step 102.

At step 102, algorithm 100 detects or otherwise determines that a braking event has occurred. A "braking event" as used herein defines an application of a detectable or measurable apply force (arrow A) to brake pedal 27 (see FIG. 1). Such an apply force (arrow A) likewise imparts pedal motion or "travel", which in turn is measurable or otherwise detectable by travel sensor 41 as described hereinabove. Algorithm 100 repeats step 102 according to the predetermined control loop, preferably every 5 to 10 milliseconds, until such a braking event is detected. Once a braking event has been properly detected, algorithm 100 proceeds to step 104.

At step 104, algorithm 100 determines whether the brake pedal apply force (arrow A, see FIG. 1) detected at step 102 falls within a stored, predetermined threshold brake apply force range, abbreviated in FIG. 2 simply as "range". For example, the lower threshold value of such a range may be set to an apply force value above which the resolution of force sensor 40 (see FIG. 1) is sufficient to enable execution of braking request ($B_C$) according to force table 90 (see FIG. 1), while the upper threshold value may be set to an appropriate value so as to avoid saturation with travel sensor 41 (see FIG. 1). Step 104 permits execution of the remaining steps of algorithm 100 to be limited or restricted to a specific portion or range of detected apply force (arrow A). If algorithm 100 determines that the detected apply force (arrow A) falls within the stored threshold brake apply force range, it proceeds to step 106. Otherwise, algorithm 100 repeats step 102.

At step 106, algorithm 100 determines whether the detected motion or travel of brake pedal 27 (see FIG. 1) is not decreasing, i.e. is traveling in a proper direction for application of brake pedal 27 (see FIG. 1). If at step 106 algorithm 100 determines that pedal travel is not decreasing, algorithm 100 proceeds to step 108. Otherwise, algorithm 100 returns to step 102. The inclusion of step 106 in algorithm 100 is preferred in order to minimize or eliminate the influence of mechanical hysteresis on the subsequent error-adjustment or adaptive method steps described hereinbelow.

At step 108, upon detection of a braking event corresponding to travel within the predetermined calibration window described hereinabove at steps 104 and 106, respectively, algorithm 100 next calculates an instantaneous travel position-based error or variance percentage, abbreviated in FIG. 2 as "ITB % Error". Step 108 determines, on a percentage basis, the variance between a force-based request (FBR) and travel position-based request (TBR). Accordingly, the value "ITB % Error" is calculated according to the equation [[TBR−FBR]/FBR]×100%. Once the value "ITB % Error" has been properly calculated, it is temporarily stored in memory 19 of EBS controller 18 (see FIG. 1). Algorithm 100 then proceeds to step 110.

At step 110, algorithm 100 sums the calculated ITB % Error from a predetermined number of samples to thereby arrive at an intermediate or nominal error total (Y). Nominal error total (Y) is temporarily stored in memory 19 of controller 18 (see FIG. 1). Algorithm 100 then proceeds to step 112.

At step 112, algorithm 100 increments the integer counter (C) by one count, then proceeds to step 114.

At step 114, algorithm 100 compares the value of integer counter (C) to a predetermined value or multiple (n) corresponding the number of samples (N) used to calculate nominal error total (Y) (see step 110). If counter (C) equals the predetermined multiple (n), algorithm 100 proceeds to step 116. Multiple (n) is selected to provide a sufficient number of braking events to occur before modifying the adapted braking torque request (ABR). Preferably, multiple (n) is set to at least 10, however any multiple (n) may be selected as appropriate within the scope of the invention as needed for a particular vehicle or electronic braking system. If the value of counter (C) does not equal multiple (n), algorithm 100 returns to step 102 without making any adjustments to the travel position-based request (TBR).

At step 116, algorithm 100 retrieves the stored nominal error total (Y) and, using the predetermined number of data samples (N), performs a simple averaging function, i.e. average=Y/N, to arrive at an average ITB % Error value, abbreviated "ITB %$_{ave}$" in FIG. 2 for simplicity. Once algorithm 100 has calculated the value "ITB %$_{ave}$" it proceeds to step 118.

At step 118, algorithm 100 compares the value "ITB %$_{ave}$" calculated in step 116 to a stored set, range, or acceptable window of error, which describes a band or window of permissible variance. Within this window, for example, an instantaneous transition between travel position-based request (TBR) and force-based request (FBR) may be considered permissible as falling within an acceptable performance tolerance. If the value "ITB %$_{ave}$" falls within this window, algorithm 100 returns to step 102 without making any adjustment to the travel position-based request (TBR). Otherwise, algorithm 100 proceeds to step 120.

At step 120, an error-adjustment factor or adjustable multiplier factor (M) is modified or adjusted by a predetermined value, percentage, or quantity. That is, the adjustable multiplier factor (M) is adjusted by an appropriate preset value, percentage, or quantity, preferably approximately 0.2 to 0.8%, although other values or percentages may be used as needed within the scope of the invention. Upon initial launch of a vehicle 10 (see FIG. 1), i.e. when a vehicle 10 is released to the consumer from production, multiplier factor (M) is initialized to a value of 1, i.e., preprogrammed or recorded in memory 19 of controller 18 (see FIG. 1) to equal 1, so that the adapted braking torque request (ABR) is initially equal to the travel position-based request (TBR). Multiplier factor (M) is then adjusted by a preset value, percentage, or quantity periodically based on the detected presence of a predetermined vehicle condition, such as explained in step 118. This occurs in order to allow the travel position-based request (TBR) to be continuously adjusted to approximate over time the force-based request (FBR). To ensure that the travel position-based request (TBR) remains within a reasonable range, multiplier factor (M) is preferably bounded by predetermined upper and lower limits.

Figure 3:
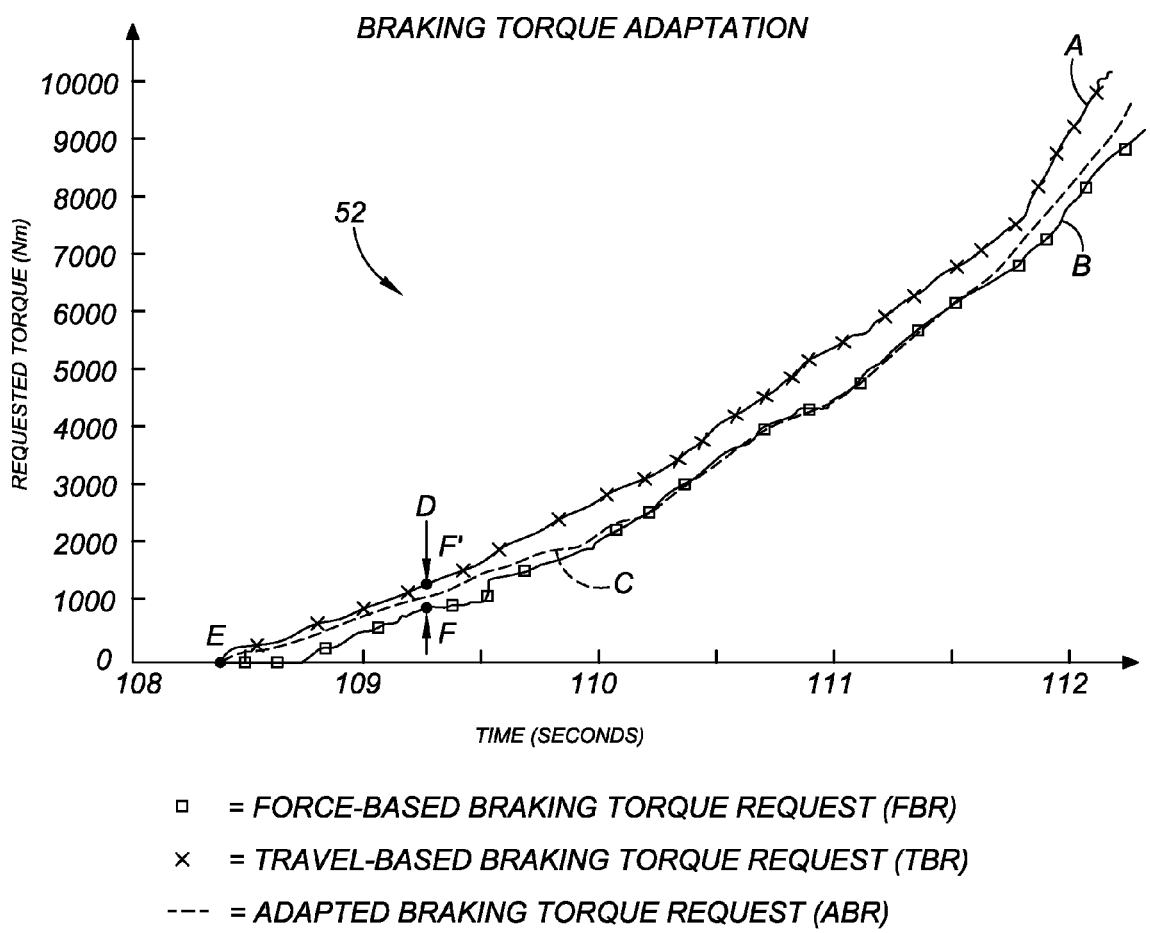
FIG. 3 is a schematic curve or graphic illustration showing a representative brake pedal sensor transition according to the invention.

Turning to FIG. 3, a representative set of braking torque curves 52 is shown describing the effect of algorithm 100 of FIG. 2 on an exemplary travel position-based request (TBR). Line A describes a representative travel position-based request (TBR), while line B describes a representative force-based request (FBR), as described previously hereinabove. The area or band between arrows D represents a variance or difference in a requested braking torque (Y-axis) at a particular moment in time (X-axis). Transitioning instantaneously between a travel position-based request (TBR) and force-based request (FBR) when such a variance is present may, depending on the magnitude of the variance, result in a perceptible discontinuity in applied braking torque.

For example, if at point E an instantaneous transition where to occur between force-based request (FBR) line B and travel position-based request (TBR) line A, or between line A and line B, such a transition will result in a negligible perceptible effect, as at point E lines A and B are approximately equal or coextensive. However, at point F of force-based request (FBR) line B, an instantaneous transition from point F to a corresponding point F' of travel position-based request (TBR) line A would result in a braking torque variance of approximately 1000 Nm, which would likely be readily perceptible to a user of vehicle 10 (see FIG. 1).

Therefore, using algorithm 100 as described hereinabove with reference to FIG. 2, an alternate or adapted braking torque request (ABR) is provided, as represented by line C.

Using algorithm 100, for example, the adapted braking torque request (ABR) represented by line C more closely approximates the force-based request (FBR) of line B by adjusting the travel position-based request (TBR) on an adaptive basis. As shown in FIG. 3, transitioning instantaneously between the adapted braking torque request (ABR) of line C and the force-based request (FBR) of line B provides a more robust, fluid transition than would otherwise be possible.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a brake pedal for delivering a braking request based on a detectable brake pedal travel position, a detectable brake pedal travel direction, and a detectable brake pedal apply force;
   a first sensor configured to detect said detectable brake pedal travel position and said detectable brake pedal travel direction;
   a second sensor configured to detect said detectable brake pedal apply force;
   at least one electronic braking system component configured to slow or stop the vehicle in response to said braking request; and
   a controller having a stored brake apply force window and an adaptive algorithm for determining a travel position-based braking torque request corresponding to said detectable brake pedal travel position, a force-based braking torque request corresponding to said detectable brake pedal apply force, and for adapting the travel position-based braking torque request to the force-based braking torque request over time to determine an adapted braking torque request, said controller being operable for receiving said braking request and selecting between one of said force-based braking torque request and said adapted braking torque request in response thereto;
   wherein said adapted braking torque request is determined by multiplying said travel position-based braking torque request by an adjustable multiplier factor, and said controller is operable for applying said at least one electronic braking system component according to said adapted braking torque request when said braking request is based on said detectable brake pedal travel position.

2. The vehicle of claim 1, wherein said travel position-based braking torque request is continuously multiplied by said adjustable multiplier factor to thereby determine said adapted braking torque request.

3. The vehicle of claim 1, wherein said adjustable multiplier factor is adjusted only when said controller determines the presence of a predetermined vehicle condition.

4. The vehicle of claim 3, wherein said controller further comprises a stored window of acceptable error and is operable for calculating an average percentage variance of said travel position-based braking torque request over said force-based braking torque request, said predetermined vehicle condition being present when said calculated average percentage variance falls outside of said stored window of acceptable error.

5. The vehicle of claim 4, wherein said controller is operable for calculating said average percentage variance only when said detectable brake pedal travel direction is not decreasing.

6. A method for adapting a travel position-based braking torque request to approximate a force-based braking torque request in a hybrid vehicle having an electronic braking system actuated by a brake pedal, the brake pedal having a detectable apply force, a detectable travel position, and a detectable travel direction, the method comprising:

determining the travel position-based braking torque request from the detectable travel position;

determining the force-based braking torque request from the detectable apply force;

comparing said travel position-based braking torque request to said force-based braking torque request to determine an average percentage variance therebetween, said comparing occurring when the detectable apply force is detected to have a value falling within a stored threshold brake apply window and when the detected travel direction is not decreasing;

continuously multiplying said travel position-based braking torque request by an adjustable multiplier factor to thereby calculate an adapted braking torque request approximating the force-based braking torque request; and modifying said adjustable multiplier factor upon determining that said average percentage variance falls outside of a stored window of acceptable error.

7. The method of claim 6, wherein said adjustable multiplier factor is initialized to 1 upon launch of the hybrid vehicle, and then adjusted by a stored percentage upon said determining that said average percentage variance falls outside of a stored window of acceptable error.

8. An adaptive electronic brake system (EBS) for a vehicle having a depressible brake pedal with a detectable brake pedal apply force and a detectable brake pedal travel position, the EBS comprising:

a force sensor operatively connected to the depressible brake pedal and operable for determining a force-based braking torque request in response to the detectable brake pedal apply force;

a travel sensor operatively connected to the brake pedal and operable for determining a travel position-based braking torque request in response to the detectable brake pedal travel position; and a controller having an algorithm configured to adapt said travel position-based braking torque request to approximate said force-based braking torque request over a time period despite variations over said time period in a relationship between said force-based braking torque request and said travel position-based braking torque request.

9. The adaptive EBS of claim 8, wherein said adaptive EBS is combined with the vehicle and configured to continuously multiply said travel position-based braking torque request by an adjustable multiplier factor.

10. The adaptive EBS of claim 9, wherein said controller is operable for calculating an average percentage variance between said travel position-based braking torque request and said force-based braking torque request based on a predetermined number of samples, and wherein said adjustable multiplier is adjusted by a stored percentage value when said calculated average percentage variance falls outside of a stored window of acceptable error.

* * * * *